(12) United States Patent
Weimer et al.

(10) Patent No.: US 6,565,820 B1
(45) Date of Patent: May 20, 2003

(54) LOW TEMPERATURE OXIDATION USING SUPPORT MOLTEN SALT CATALYSTS

(75) Inventors: Alan W. Weimer, Niwot, CO (US); Peter J. Czerpak, Albany, NY (US); Patrick M. Hilbert, Silver Spring, MD (US)

(73) Assignee: University Technology Corporation, Boulder, CO (US)

( * ) Notice: Subject to any disclaimer, the term of this patent is extended or adjusted under 35 U.S.C. 154(b) by 0 days.

(21) Appl. No.: 09/574,766

(22) Filed: May 19, 2000

Related U.S. Application Data

(60) Provisional application No. 60/135,030, filed on May 20, 1999.

(51) Int. Cl.$^7$ ................................................ C01B 7/00
(52) U.S. Cl. .......................... 423/240 S; 423/DIG. 12
(58) Field of Search ........................... 423/240 S, 241, 423/242.2, 244.02, DIG. 12; 502/202, 268, 344, 184

(56) References Cited

U.S. PATENT DOCUMENTS

| | | | | |
|---|---|---|---|---|
| 4,194,990 A | * | 3/1980 | Pieters et al. ................. | 252/441 |
| 4,898,845 A | * | 2/1990 | Datta et al. ..................... | 502/3 |
| 5,089,245 A | * | 2/1992 | Eyman et al. ............ | 423/415 A |
| 5,483,919 A | | 1/1996 | Kokoyama et al. ............ | 117/89 |
| 5,589,714 A | | 12/1996 | Howard ....................... | 257/788 |
| 5,705,265 A | * | 1/1998 | Clough et al. ............ | 428/307.3 |
| 5,855,680 A | | 1/1999 | Soininen et al. ............. | 118/719 |
| 6,043,177 A | | 3/2000 | Falconer et al. ................ | 502/4 |
| 6,051,517 A | | 4/2000 | Funke et al. ................... | 502/4 |

OTHER PUBLICATIONS

Klaus et al., Atomic Layer Controlled Growth of $SiO_2$ Films Using Binary Reaction Sequence Chemistry, Appl. Phys. Lett. 70 (9), Mar. 3, 1997.
Ferguson et al., Atomic Layer Deposition of $Al_2O_3$ and $SiO_2$ on BN Particles Using Sequential Surface Reactions, App. Surface Science (33), Jun. 30, 1999.
Ferguson et al., Atomic Layer Deposition of Ultrathin Conformal $Al_2O_3$ Films on BN Particles, Thin Solid Films (31), Oct. 4, 1999.
Ott et al., $Al_2O_3$ Thin Film Growth on Si (100) Using Binary Reaction Sequence Chemistry, Thin Solid Films 292 (135–144) May 10, 1996.
Dillion et al., Surface Chemistry of $Al_2O_3$ Deposition Using $Al(CH_3)_3$ and $H_2O$ in a Binary Reaction Sequence, Surface Science 322 (230–242) Aug. 23, 1994.
Sneh et al., Atomic Layer Growth of $SiO_2$ on IS (100) Using $SiCi_4$ and $H_2O$ in a Binary Reaction Sequence, Surface Science 334 (135–152) Mar. 7, 1995.
Ferguson et al., Atomic Layer Deposition of $SiO_2$ Films on BN Particles Using Sequential Surface Reactions, Chemistry of Materials (31) Apr. 11, 2000.

* cited by examiner

Primary Examiner—Stanley S. Silverman
Assistant Examiner—Edward M. Johnson
(74) Attorney, Agent, or Firm—Gary C Cohn PLLC

(57) ABSTRACT

Molten salt reactions are performed by supporting the molten salt on a particulate support and forming a fluidized bed of the supported salt particles. The method is particularly suitable for combusting hydrocarbon fuels at reduced temperatures, so that the formation $NO_x$ species is reduced. When certain preferred salts are used, such as alkali metal carbonates, sulfur and halide species can be captured by the molten salt, thereby reducing $SO_x$ and HCl emissions.

2 Claims, 1 Drawing Sheet

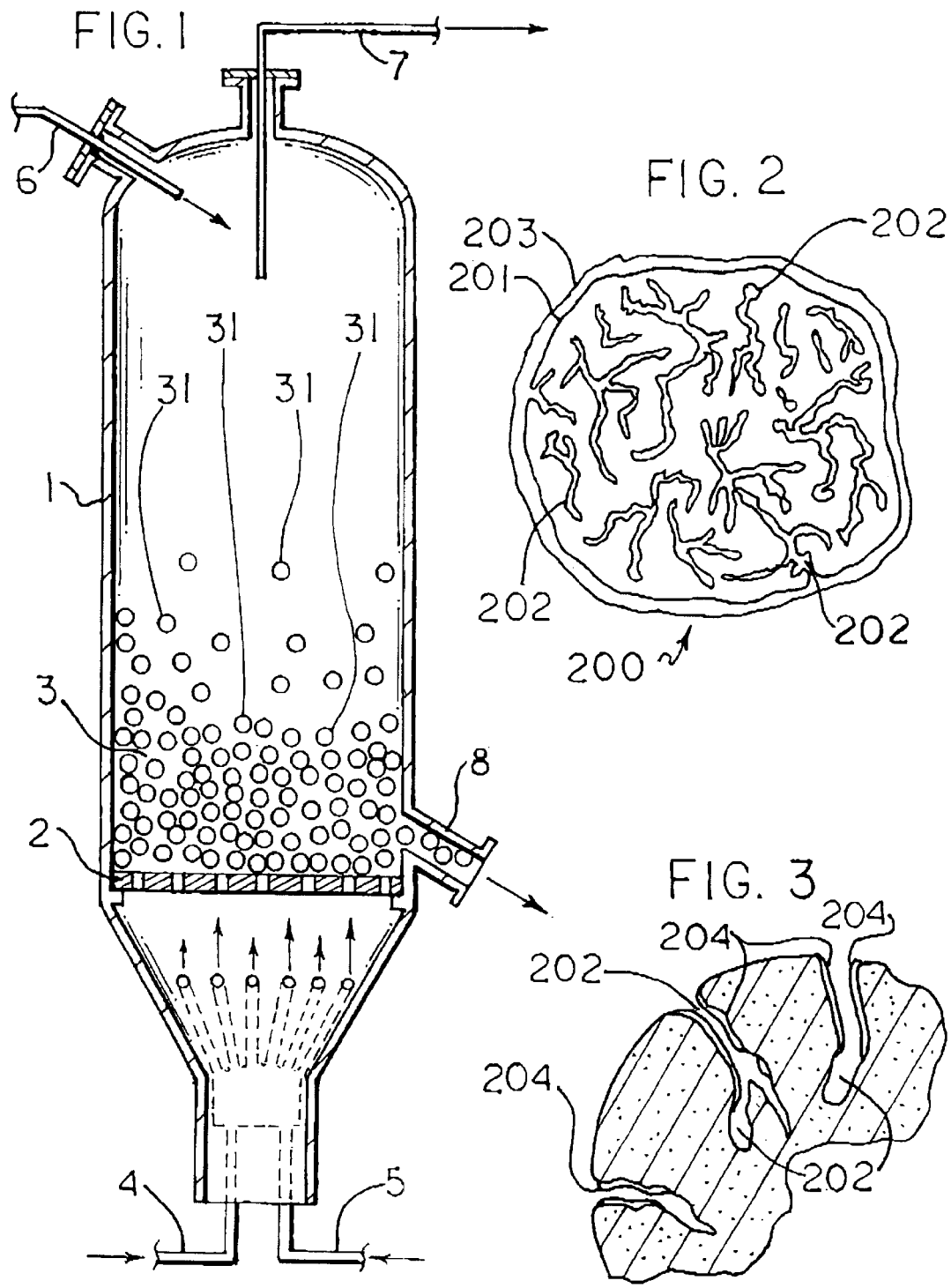

LOW TEMPERATURE OXIDATION USING SUPPORT MOLTEN SALT CATALYSTS

CROSS-REFERENCE TO RELATED APPLICATION

This application claims benefit of provisional application Ser. No. 60/135,030, filed May 20, 1999, entitled Low Temperature Oxidation Using Supported Molten Salt Catalysts, which is incorporated herein by reference in its entirety.

STATEMENT REGARDING FEDERALLY SPONSORED RESEARCH OR DEVELOPMENT

The research and development leading to the subject matter disclosed herein was made under contract with the United States Department of Energy, Contract No. DEFG26-98FT40122.

BACKGROUND OF THE INVENTION

This invention relates to processes for conducting chemical reactions in the presence of a molten inorganic salt.

A number of chemical reactions can be conducted in the presence of a molten salt. Among these are, for example, coal gasification reactions, propene oxidation, pyrolysis of kraft lignin, preparation of mixed phosphates, electrodeposition of aluminum from aluminum chloride, deoxidation of niobium and titanium, destruction of cyanides, titanium production, synthesis of 2-arylpropionic esters, reductions of nitrogen gas, oxidations of methane to methanol, electrodeposition of titanium onto alumina, and silicon nitride, spent oxide fuel reduction processes, palladium-catalyzed Trost-Tsuji C-C coupling reactions, various electrochemical reactions and among many others. The molten salt can perform various functions, depending on the particular reaction being performed. Thus, the molten salt can act as a reagent, a catalyst or even a solvent, depending on the particular reaction system. In some cases, the salt may perform more than one of these functions.

Notable classes of chemical reactions that can be conducted in the presence of a molten salt are oxidation reactions of organic compounds, i.e., combustion reactions. Combustion reactions are perhaps more important than any other class of industrial chemical reactions, as they provide tremendous quantities of heat to drive, or to produce steam which is then used to drive, the turbines that generate most of the world's electrical power. The abatement and control of environmental pollution caused by combustion products are a major world problem and the focus of global efforts to reduce "greenhouse gas" emissions that ultimately contribute to global warming.

Of particular significance is the reduction of $NO_x$ and $SO_x$ that are associated with the combustion of natural gas at high temperatures near 1200° C. Although modern systems use lean premixed combustion gases to reduce temperatures, the combustion temperatures are still high enough to promote $NO_x$ formation. In addition, the high temperatures also require that dilution air be added to meet turbine temperature requirements. Because the production of $NO_x$ depends exponentially on temperature, it is desirable to develop a method for combustion of natural gas and other vaporizable fuels, such as light diesel fuel, at lower temperature, preferably less than 1000° C. It is also desirable to simultaneously capture in-situ any residual sulfur species present in the fuel to eliminate $SO_x$ formation as well.

It has been proposed to accomplish this by conducting the oxidation reactions in the presence of certain molten salts, which permit lower temperature combustion to take place. See, for example, U.S. Pat. Nos. 3,647,358, 3,642,583 and 4,246,255. Molten salts have been used to selectively catalyze various oxidation reactions. Most non-charged materials are soluble in molten salts. It is believed that the solute acquires an electrostatic orientation in the melt, reducing the energy required to initiate and sustain chemical reactions. Under these conditions, the solute, when exposed to oxygen, will oxidize at temperatures lower than those normally required for oxidation while maintaining high oxidation efficiencies. Molten salt catalysts have been used to selectively oxidize various fuels at reduced temperatures due to the fuel's solubility in the molten salt and the lower required activation energies.

Although molten salt technology provides substantial potential advantages, practical problems have largely prevented its implementation into commercial processes. The main problem is that it is has been difficult to get sufficient mass transfer between a reagent stream and a bed of molten salt to operate the process efficiently. Gaseous reactants that are bubbled through a molten salt bed tend to form large bubbles that have relatively low interfacial surface areas (i.e. between the gas and molten salt phases). As mass transfer rates, and thus reaction rates, will depend on interfacial surface area, this low surface area tends to result in low conversions. Conversions in principle can be improved by making the interfacial surface area larger (such as by making smaller bubbles) or by making the residence time greater, but neither of these approaches has been found to be practical, especially for large scale operations. These approaches result in excessive energy requirements or excessive capital expenses for equipment necessary to contain a large bed of molten salt.

Thus, it would be desirable to provide an improved method for conducting chemical reactions in the presence of a molten salt.

SUMMARY OF THE INVENTION

In one aspect, this invention is a method for using a molten salt to carry out a chemical reaction, comprising passing a chemical reagent or mixture thereof through a fluidized bed of support particles that support at least one molten salt, under conditions such that said reagents or mixture of chemical reagents react in the presence of the molten salt.

In a second aspect, this invention is a method for the low-temperature oxidation of an organic compound, comprising passing a mixture of the organic compound and an oxygen source through a fluidized bed of support particles that support at least one molten salt that catalyzes the oxidation of the organic compound, under conditions such that the organic compound is oxidized in the presence of the molten salt.

In a third aspect, this invention is a process for using a molten salt to carry out a chemical reaction of a gas, comprising:

providing a molten salt supported on fine particles in a fluidized bed; and reacting the gas in the presence of the molten salt; wherein the molten salt catalyzes a reaction of or reacts with the gas.

In a fourth aspect, this invention is a method for low-temperature oxidation of gaseous species, comprising the steps of:

providing a supported molten salt catalyst in a fluidized bed; and contacting the catalyst with at least one gaseous species to be oxidized.

BRIEF DESCRIPTION OF THE DRAWINGS

FIG. 1 is a schematic drawing, in section, of a fluidized bed process according to the bed.

FIG. 2 is an enlarged view of a porous support particle for use in the invention.

FIG. 3 is an enlarged view, in section, of a portion of a porous support particle for use in the invention, showing a molten salt deposited in the pores.

DETAILED DESCRIPTION OF THE INVENTION

In this invention, chemical reactions are conducted in the presence of a fluidized bed of particles that support a molten salt. One or more reactants are passed through the fluidized bed, where the desired reaction takes place. Waste and product streams are removed either above or below bed level, depending on their density. The operation of a fluidized bed, in simplified form, is schematically represented in FIG. 1. In FIG. 1, vertical column 1 includes perforated support plate 2. Column 1 will typically have a height (above the perforated support plate) to diameter ratio of about 0.5:1 to about 10:1, more typically about 0.7:1 to about 2:1. Perforated support plate 2 supports the weight of particle bed 3 (when not fluidized) and permits the fluidizing gas and/or gaseous reagent to pass upward through particle bed 3 to create the fluidizing conditions. As shown in FIG. 1, particle bed 3 is in a fluidized state. Particle bed 3 includes a plurality of particles 31 (shown several orders of magnitude larger than scale) made of a support that carries a molten salt, as described more below. Column 1 includes means 4 and 5 for introducing a fluidizing gas and/or a gaseous reactant beneath perforated support plate 2. These means can be, for example, a conduit for carrying the gas into the column, and one or more spargers, one or more gas jets, a perforated plate, a bubbler, or similar device that distributes the gas across the bottom of perforated support plate 2. Of course, various kinds of apparatus can be included to regulate flow, provide safety features, and the like.

In some cases, such as in combustion reactions, one or more gaseous reactants may serve as the fluidizing gas, so that no gases other than the reactant(s) are needed.

The fluidizing gas and/or gaseous reactant pass upwardly through particle bed 3, causing the particles to become fluidized. Fluidization causes a small (i.e., typically no more than 50%, preferably no more than about 20%) expansion of the height of the particle bed. Any gaseous reactant comes into intimate contact with the molten salt on the particles 31, where the desired reaction takes place.

Column 1 further includes at least one outlet 7 for removing effluent gasses, i.e., the fluidizing gas and/or any gaseous reaction products.

In the embodiment shown in FIG. 1, column 1 also contains solid/liquid-introducing means 6 for introducing solid or liquid materials. Multiple such means may be included if desirable. Conversely, solid/liquid-introducing means 6 may not be required, depending on the nature of the process. The solid/liquid-introducing means can be a chute, a system for metered delivery of the solid or liquid materials, or a simple opening though which materials can be added. The solid/liquid introducing means is preferably adapted with a door or other closure so that effluent gases do not escape through it as solid or liquid materials are added to the column.

Examples of solid or liquid materials that can be added include, for example, additional support particles, additional quantities of the salt, solid or liquid reagents, and the like. In addition, the embodiment shown in FIG. 1 also includes solid/liquid removal means 8, through which solid and/or liquid waste or product streams can be removed. Again, depending on the particular process, no solid/liquid removal means may be needed, or multiple such means may be provided.

Particles 31 include a support material and a molten salt. As discussed more below, the support is preferably porous. The support material is selected with the particular process conditions in mind and generally will meet the following criteria: (1) particle size and density such that the particles can be fluidized and maintain fluidization in the presence of the molten salt, (2) sufficient mechanical integrity to withstand operation at fluidizing conditions without significant mechanical degradation, (3) chemically stable under process conditions, including being nonreactive with the molten salt and reagents, (4) thermally and, if the process is conducted under oxidation conditions, oxidatively stable under the process conditions, (5) insoluble in the various other components present in the process and (6) chemical nature such that the molten salt will readily adhere to the surface of the support particles.

As will be apparent from the foregoing, the selection of a support for a particular chemical process will depend on a number of process conditions, including the temperature, the particular molten salt or salts, the particular reactants, the selection of fluidizing gas and other conditions. However, in general, inorganic materials that have melting and decomposition temperatures above about 1000K, preferably above 1500K, more preferably above 2000 K can be used. Of course, the melting and decomposition temperatures of the support must exceed the melting temperature of the molten salt. Supports that can be used, depending of course on the particular process being run, include $SiO_2$, SiC, $Al_2O_3$, $ZrO_2$, NiO, $Fe_2O_3$, WC, $TiO_2$, CaO, $Ca_3PO_4$, AlN, various types of zeolite materials, and the like.

Silicon dioxide is a particularly suitable support for reactions involving sodium tungstenate ($Na_2WO_4$), sodium sulfate ($Na_2SO_4$), cesium carbonate ($Cs_2CO_3$) and boric oxide ($B_2O_3$) over a wide temperature range. Alumina ($Al_2O_3$) is a particularly suitable support for reactions involving sodium tungstenate, sodium sulfate and cesium carbonate, again over a wide temperature range. Zirconia ($ZrO_2$) is a particularly suitable support, over a wide temperature range, for reactions involving sodium carbonate ($Na_2CO_3$), potassium carbonate ($KCO_3$), sodium tungstenate, sodium sulfate and boric oxide. Nickel oxide (NiO) is a particularly suitable support, over a wide temperature range, for reactions involving sodium carbonate ($Na_2CO_3$), lithium carbonate ($Li_2CO_3$), potassium carbonate ($K_2CO_3$), sodium tungstenate, sodium sulfate, cesium carbonate and boric oxide. Iron oxide ($Fe_2O_3$) is particularly suitable for reactions involving sodium carbonate, potassium carbonate, sodium tungstenate, sodium sulfate, cesium carbonate and boric oxide. Tungsten carbide (WC) is useful in conjunction with boric oxide over a wide temperature range, and with sodium carbonate, potassium carbonate, lithium carbonate and sodium tungstenate at temperatures below about 1200–1400K. Titanium dioxide ($TiO_2$) is useful in conjunction with sodium tungstenate, sodium sulfate, cesium carbonate and boric oxide over a wide temperature range. Calcium oxide (CaO) is a particularly suitable support, over a wide temperature range, for reactions involving sodium carbonate, lithium carbonate, potassium carbonate, sodium tungstenate, sodium sulfate and cesium carbonate. Calcium phosphate ($Ca_3(PO_4)_2$) is useful at temperatures of about 1400K or below in reactions involving sodium carbonate and over a wide temperature range for reactions involving lithium carbonate, potassium carbonate, sodium tungstenate, sodium sulfate, cesium carbonate and boric oxide.

Iron oxide, zirconium dioxide, calcium oxide and alumina are preferred support materials for a wide range of reactions.

The salt is one that is molten at the desired process conditions, and which acts as a reagent, a catalyst, or a solvent in the process. The salt may perform two or more of these functions. The melting temperature is not critical so long as the salt (or mixture of salts) is liquid at the desired process temperatures. Salts or a mixture of salts having melting temperatures of below about 1000K, preferably below about 700K, more preferably below about 400K. The melting temperature of the salt may be below room temperature, and preferably is at least about 325K. A number of salts are known to be useful in molten salt reactions, including, for example, sodium carbonate, potassium carbonate, lithium carbonate, cesium carbonate, sodium tungstenate, lithium nitrate, sodium sulfate, boric oxide, calcium oxide, zinc chloride/potassium chloride mixtures, zinc chloride/sodium chloride mixtures, aluminum chloride/ N-(n-butyl)pyridinium chloride mixtures, lithium chloride, calcium chloride, alkali metal nitrates, alkali metal polysulfides, aluminum chloride-1-methyl-3-ethylimidazolium chloride, and the like. Mixtures of two or more salts can be used, and may be desirable for specific purposes in certain reaction systems. For example, certain salt mixtures exhibit eutectic melting points that permit operation within some desired temperature range. Sodium carbonate/lithium carbonate mixtures are an example of this. In other cases, mixtures of salts may be used because each salt component performs a different function within the process.

Molten salt loadings are generally preferred to be as high as possible, consistent with maintaining the salt on the support, being able to fluidize the bed and obtaining an acceptable reaction rate. For non-porous supports, molten salt loadings tend to be less than 2% by weight, and more typically from about 0.1 to about 0.5% by weight, based on the weight of the support particles. Generally, maximum molten salt levels tend to increase with increasing support particle size and with increasing support particle density. The ability to maintain fluidization is related to the momentum of the particles, as well as to capillary forces that are present when molten salt is present on the particle surface. The capillary forces tend to cause particles to adhere on contact. On the other hand, increased particle momentum provides more energy for the particle to overcome the capillary forces. Increasing particle size reduces the surface area/unit weight, thus reducing the potential number of contact points between particles, in turn reducing the amount of particle agglomeration. Denser particles tend to gain greater momentum in the fluidized bed, due to their higher mass. Thus, fluidization conditions can be maintained at higher molten salt loadings when the support particle size is increased or its density increased.

Considerably greater molten salt loadings are achievable when the support is porous. When porous supports are used, molten salt loadings of up to 20% by weight or more molten salt based on the weight of the support particles can be achieved with stable fluidization of the bed. Preferably, the molten salt loading onto a porous support is from about 3 to about 15%, more preferably from about 5 to about 10% by weight.

As using porous particles provides a simple method of increasing the molten salt loading, their use is preferred. Porosity of small particles is generally expressed in terms of the surface area/unit weight of the particles. Preferred supports are sufficiently porous that their surface area per unit weight is increased to at least 1.5 times, preferably to at least 2 times, that of nonporous particles of the same average particle size and made from the same material. Thus, particles having a pore fraction of about 10% or more, preferably about 25% or more are preferred. At some point, however, the benefits of porosity are exceeded by the fragility of the particles. It is preferred that the particles do not have a pore fraction of greater than about 70%, more preferably not more than 50%.

Although this invention is not limited by any theory, it is believed that the presence of pores permits the molten salt to become absorbed into the support particle. Thus less of the salt is present on the surface of the support particles. As a result, the particles become heavier with little or no increase in diameter, thus increasing their density. In addition, the relative absence of molten salt on the surface of the particles reduces capillary forces that ordinarily tend to adhere liquid-coated particles together. Both the increased density of the particles and the relative lack of adhesive capillary forces on the surface of the particles tend to disfavor particle agglomeration. As a result, bed fluidization is more easily maintained, because larger, difficult-to-fluidize particles form at a low rate.

FIG. 2 illustrates a porous support impregnated with a molten salt. Particle 200 includes support 201 having pores schematically represented by lines 202. As shown a film or coating 203 of molten salt may be present on the external surfaces of support 201, but preferably substantially all of the molten salt is contained within pores 202.

The diameter of the support particle can be as small as about 60 microns, and as large as about 5000 microns. As will be apparent from the foregoing discussion, the optimum particle size for any particular application will be related to several other parameters, such as the loading of molten salt, the bulk density of the support material, the porosity of the support, fluidizing gas velocities, and the like. Non-porous supports are preferably at least about 300 microns in diameter, more preferably at least about 500 microns in diameter. Porous supports are preferably at least about 250 microns in diameter, and are most preferably from about 350–1000 microns in diameter. Again, it is noted that optimum particle sizes may vary according to the particular process.

FIG. 3 shows an enlarged view of pores 202, showing quantities of impregnated molten salt 204 resident upon the interior surfaces of pores 202. The embodiment shown is a preferred one in which the impregnated molten salt only partially fills pores 202. This allows for rapid transfer of the reactants into and out of pores 202, so that mass transfer in and out of the pores is facilitated. In this way, faster reaction rates can be achieved. When a porous support is used, it is preferred to load sufficient molten salt so that from about 5%, more preferably to about 10%, even more preferably about 20%, to about 75%, more preferably to about 50%, more preferably to about 35% of the pore volume of the support is filled with the molten salt.

The support can be charged with the salt in several ways. One convenient method is to form a solution of the salt in water or other convenient solvent and wash the support particles with the solution until the desired loading is achieved. This solvent technique can be done at ambient temperatures or at any elevated temperature up to or even above the melting temperature of the salt. This can be done in situ in the fluidization column if desired, or else the support can be charged with the salt in some different vessel. When the salt is added to the support in this manner, it is usually preferred to remove the water or solvent from the support particles, such as by filtration, centrifugation, heating, vacuum stripping, or a combination of these techniques. In some cases, though, the water or solvent does not interfere with the chemical reactions being conducted in the bed, in which case a removal step is not necessary.

An alternative way of making the supported salt is to mix the molten salt directly with the support particles, at some temperature above the melting temperature of the salt. Again, this can be done within the bed or elsewhere. An advantage of this technique is that no water or solvents are needed. However, care must be taken to avoid particle agglomeration due to the formation of salt bridges between particles if the molten salt is cooled below its melting temperature. This technique often can be used to add salt to the support during operation of the bed without disrupting the process.

Chemical processes are conducted according to the invention by fluidizing the bed, heating the fluidized particles to the desired reaction temperature and then introducing the reactants under conditions that the desired reaction temperature and bed fluidization are maintained. If necessary, the reactants and/or fluidizing gas may be preheated before introducing them into the column. Once the reaction has begun, fluidization gas is continuously fed into the column through (referring to FIG. 1) gas introduction means 4 and/or 5. If the reactants do not serve as the fluidizing gas, they are continuously or intermittently added to the bed, either through gas introduction means 4 and/or 5 (if a gas), or through solid/liquid introduction means 6 (if introduced as a liquid or solid). Vaporizable liquids or solids can also be added at or below bed level. Reaction products can be taken out above the bed (if a gas), such as through outlet 7. Higher density reaction products can be removed through solid/liquid removal means 8.

In, some cases, it may be desirable to add more of the supported molten salt during the operation of the process. Examples of this include cases where the molten salt is a reagent in the chemical process, or in which it operates as a catalyst but becomes exhausted over time. In such cases, the additional supported molten salt is conveniently added through a solid/liquid introduction means 6, either periodically or continuously throughout the process. To avoid overfilling the bed, spent supported molten salt can be removed through a sold/liquid removal means 8.

Total gas velocities (including fluidizing gas plus any gaseous reactant stream, if different than the fluidizing gas) are not critical provided they are sufficient to fluidize the bed and provide a desirable gas residence time within the fluidized bed. Typical gas velocities can range broadly from about 0.01 to about 30 m/s or more, depending on column dimensions, particle size and mass, loading of salt, porosity of the support, and the like. It is usually desirable to select a gas velocity that is somewhat above the minimum required to fluidize the bed.

Bed thickness is selected in conjunction with gas velocities to achieve both bed fluidization and a desirable gas residence time within the fluidized bed. Gas residence times are advantageously at least about 0.1 second, preferably at least about 0.5 second, and more preferably at least about 1 second, up to 10 seconds, preferably up to about 7 seconds, more preferably up to about 3 seconds.

The process is typically conducted isothermally, with the fluidized particles being maintained at a more or less constant temperature once steady-state conditions are reached. If necessary to maintain isothermal conditions, the column may be equipped with cooling to remove excess heat. In processes such as combustion, the exothermic nature of the reaction provides the necessary process heat to maintain isothermal conditions; excess heat can be recovered and the energy values used, for example, for heating or to produce process steam for a variety of uses. Process steam may be used to generate power such as through operation of a turbine.

Thus, the process of the invention provides a convenient and efficient way to conduct molten salt reactions. The process provides greatly improved mass transfer of reagents to and from the surface of the molten salt, so that reactions occur more rapidly and with higher yield. When supported on the support particles, the molten salt assumes a very high surface area configuration that promotes operational efficiency.

The method is applicable to any process in which the reagents and reaction products are capable of being passed through the fluidized bed. Thus, it is generally applicable to reactions such as, for example, condensation reactions, hydrocarbon cracking, isomerization, halogenation, oxychlorination, oxidation, dehalogenation, and the like. Specific processes include hydrocarbon cracking and desulfurization using molten carbonate salts, chlorine removal from hydrogen sulfide and oxidation of sulfur dioxide to sulfur trioxide. The invention is also adaptable to coal and biomass gasification reactions of the type described by Matsunami et al, Sol. Energy 68(3) 257261, (2000) and Peelen et al. in *High Temp. Mater. P-US* 2: (4) 471–482 (1998); propene oxidation of the type described by Nijhuis et al., in *Appl. Catal. A-Gen* 196(2), (2000); pyrolysis of kraft lignin; the preparation of mixed phosphates of the type described by Afanasiev in *Chem. Mater.* 11: (8) 1999–2007 (1999); the electrodeposition of aluminum from aluminum chloride-N-(n-butyl)pyridinium chloride of the type described by Ali et al in *Indian J. Chem. Techn.* 6(6) 317–324 (1999): deoxidation of niobium and titanium as described by Suzuki et al. in *J. Alloy Compd.* 288 (1–2) 173–182 (1999); cyanide destruction reactions of the type described by Alam et al. in *Environ. Sci. Technol.* 32: (24) 3986–3992 (1998); titanium production processes of the type described by Deura et al. in *Metall. Mater. Trans. B* 29 (6) 1167–1174 (1998); 2-arylpropionic esters synthesis reactions of the type described by Zim et al. in *Tetrahedron Lett.* 39: (39) 7071–7074 (1998); nitrogen gas reduction reactions of the type described by Goto et al., in *Electrochim Acta* 43: (21–22) 3379–3384 (1998); oxidations of methane to methanol such as are described by Lee et al. in *Z. Naturforsch B* 53: (2) 249–255 (1998); electrodeposition of titanium onto alumina, and silicon nitride, as described by Wei et al. in *Mater. Lett.* 31: (3–6) 317–320 and 359–362 (1997), spent oxide fuel reduction processes, and palladium-catalyzed Trost-Tsuji C-C coupling reactions as described by de Bellofon et al. in *J. Mol. Catal. A-Chem* 145 (1–2) 121–126 (1999). A process of particular interest is the combustion of fuel gasses such as natural gas, a vaporizable liquid hydrocarbon, syngas and a $C_{1-6}$ alkane. Using the process of this invention, rapid and complete combustion of these gases can be conducted at temperatures well below 1200K, preferably below 1100K and more preferably from about 600–1000K. At temperatures below 1100K, and especially below 1000K, $NO_x$ formation is minimized.

In combusting fuel gasses according to the invention, a mixture of fuel gas and an oxygen source (typically air) is used as both the fluidizing gas and the reactant stream. An excess of oxygen, preferably a 5–25% excess based on the moles of fuel gas, is typically used. The gas stream is passed upwardly through the fluidized bed, contacting the molten salt on the particles. The hydrocarbon values are oxidized to carbon dioxide and water, with very small amounts of carbon monoxide being produced.

The molten salt can be any that catalyzes the oxidation at the desired temperature, including, for example $Na_2CO_3$, $K_2CO_3$, $Li_2CO_3$, $Cs_2CO_3$, $LiNO_3$, $Na_2WO_4$, $Na_2SO_4$, $B_2O_3$ and the like. However, commercially available fuel gasses typically contain varying amounts of sulfur-containing and/or halogenated impurities such as $H_2S$ and COS, various organic polysulfides, halogenated alkanes and similar compounds. These may range from trace amounts to, in rare cases, 90 mole-% of the fuel. The sulfur-containing compounds ordinarily would be oxidized to $SO_x$ compounds that would escape with the effluent gas. Thus, preferred molten salts (or molten salt mixtures) are those that react with the sulfur and/or halogen-containing compounds to capture sulfur and/or halogens and remove them from the gaseous effluent stream.

Molten salts that perform this latter function well include alkali metal carbonates, in particular lithium carbonate, sodium carbonate, potassium carbonates and cesium carbonate, or mixtures of two or more of these. Sulfur capture mainly proceeds through the reaction

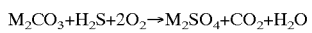
$M_2CO_3+H_2S+2O_2 \rightarrow M_2SO_4+CO_2+H_2O$ wherein M represents the alkali metal ion. Halogen capture is believed to be due to the formation of HCl under the conditions of the combustion, which reacts with the alkali metal carbonate to form the corresponding halide salt (e.g., NaCl). Lithium, sodium carbonate and potassium carbonate, or mixtures of any two or more of these are especially preferred. Mixtures of lithium and sodium carbonate and of sodium and potassium carbonate are most preferred. If desired, the aforementioned carbonate salt can be used in combination with another type of molten salt such as those described above. Particularly suitable salts for use in combination with the carbonate salts include sodium sulfate, sodium nitrate and the like.

Because the molten salts that are reactive with sulfur and/or halogens are consumed, it is necessary to replenish those salts periodically. As discussed before, this can be accomplished by introducing additional amounts of supported molten salt continuously or intermittently during the operation of the process, or by shutting down the process periodically to substitute fresh supported molten salt for the spent catalyst.

Thus, this invention provides an economical method by which large quantities of combustible gasses can be burned at temperatures at which $NO_x$ formation is minimized, while at the same time reducing $SO_x$ and halogen emissions. Thus, the process is readily adaptable for use in electrical power and/or steam generation, wherein the excess heat of reaction is captured and converted to steam and/or electrical power.

Another use of the invention is in hazardous waste processing. Organic waste products of various types can be oxidized in accordance with the invention by passing a stream of the waste products through a fluidized bed of supported molten salt. Among such waste products are chlorinated hydrocarbons, including PCBs (polychlorinatedbiphenyls), trichlorobenzene, DDT (dichlorodiphenhl-trichloroethane) and other chlorinated aromatic compounds; nitrated and polynitrated compounds such as ammonium picrate, trinitrotoluene, mixed radioactive wastes, organic sulfides and polysulfides, dioxin, asphaltenes, organic cyanide compounds and the like.

The following examples illustrate a suitable set of fluidization conditions for certain embodiments of the invention. The examples are not to be construed as limiting the invention in any way.

EXAMPLE 1

A fluidized bed reactor having an internal diameter of 7.5 cm and equipped with a perforated plate distributor containing 18-1 mm holes is charged with 350 grams of Alcoa CPN 28×48 mesh alumina particles. The porous particles have an average diameter of 450 microns and a surface area of 318 $m^2/g$. The particles are heated to 250° C. for several hours in the reactor to drive off any absorbed water. The particles are then heated to 400° C. and air is pumped in through the distributor plate at varying rates to establish a minimum fluidization velocity for the neat particles. Once the minimum fluidization velocity is established, the fluidizing gas flow rate is adjusted to 15 cm/s above the minimum fluidization velocity. The pressure drop across the bed is about 725 Pa. While maintaining reactor temperature at 400° C. and constant fluidizing gas velocity, 225 g of a lithium nitrate solution (9 g $LiNO_3$/100 ml water) is added to the reactor in 5-ml increments over several days. Bed fluidization is evaluated by measuring the pressure drop across the bed; a constant pressure drop reflects good bed fluidization as the salt solution is added. Bed fluidization is easily maintained while the entire quantity of $LiNO_3$ (20.5 g) is added.

EXAMPLE 2

The ability to maintain bed fluidization with added molten salt is evaluated in a manner similar to that described in Example 1. In this example, equal weights of nonporous silicon dioxide particles of various diameters are used instead of the porous alumina particles used in Example 1.

When nonporous particles having a diameter of 350 microns are used, bed fluidization is lost before even 0.5 g of $LiNO_3$ is added. However, fluidization conditions are sustained when a loading of 0.5 g $LiNO_3$ is supported on 350 g of nonporous, 850 micron diameter particles. When the particle size is increased to 1100 microns, nearly 2 grams of $LiNO_3$ can be added before bed fluidization is lost.

What is claimed is:

1. A method for the low-temperature oxidation of an organic compound, comprising passing a mixture of the organic compound and an oxygen source through a fluidized bed of support particles that support at least one molten salt that catalyzes the oxidation of the organic compound, under conditions such that the organic compound is oxidized in the presence of the molten salt, wherein:

(a) the fluidized bed is maintained at a temperature of less than about 1200° K;

(b) the support is porous and selected from $SiO_2$, $AlO_3$, $ZrO_2$ and $Fe_2O_3$ or a mixture of two or more thereof;

(c) the organic compound is selected from natural gas, a vaporizable hydrocarbon, syngas, a $C_{1-6}$ alkane or a mixture of two or more thereof; and (d) the molten salt is an alkali metal carbonate, an alkali metal sulfate, an alkali metal tungstenate, and alkali metal nitrate, an alkali metal nitrite, $B_2O_3$ or a mixture of two or more thereof.

2. A method for the low-temperature oxidation of an organic compound, comprising passing a mixture of the organic compound and an oxygen source through a fluidized bed of support particles that support at least one molten salt that catalyzes the oxidation of the organic compound, under conditions such that the organic compound is oxidized in the presence of the molten salt, wherein:

(a) the fluidized bed is maintained at a temperature of less than about 1200° K;

(b) the support is porous and selected from $SiO_2$, $Al_2O_3$, $ZrO_2$ and $Fe_2O_3$ or a mixture of two or more thereof;

(c) the organic compound is selected from natural gas, a vaporizable hydrocarbon, syngas, a $C_{1-6}$ alkane or a mixture of two or more thereof;

(d) the organic compound contains sulfur-containing and/or halogenated impurities, and the molten salt reacts to capture at least a portion of the sulfur and/or halogen atoms contained in the impurities, and (e) the molten salt is lithium, sodium or potassium carbonate, or a mixture of two or more thereof.

* * * * *